United States Patent [19]
Knebel et al.

[11] Patent Number: 5,984,258
[45] Date of Patent: Nov. 16, 1999

[54] METHOD AND APPARATUS FOR CONTROL OF A SHAPE MEMORY ALLOY ACTUATOR FOR A FUEL INJECTOR

[75] Inventors: Albert Martin Knebel, Holcomb; Michael Raymond Salemi, Rochester; James Zizelman, Honeoye Falls, all of N.Y.

[73] Assignee: General Motors Corporation, Detroit, Mich.

[21] Appl. No.: 09/162,400

[22] Filed: Sep. 28, 1998

[51] Int. Cl.⁶ .................................................. F16K 31/02
[52] U.S. Cl. ..................... 251/11; 251/129.06; 137/339
[58] Field of Search ........................ 251/11, 129.06; 137/338, 339

[56] References Cited

U.S. PATENT DOCUMENTS

| | | | |
|---|---|---|---|
| 4,553,393 | 11/1985 | Ruoff | 60/528 |
| 4,806,815 | 2/1989 | Honma | 310/307 |
| 4,919,177 | 4/1990 | Homma | 148/133 |
| 4,973,024 | 11/1990 | Homma | 251/11 |
| 5,061,914 | 10/1991 | Busch et al. | 337/140 |
| 5,211,371 | 5/1993 | Coffee | 251/11 |
| 5,284,179 | 2/1994 | Shikida et al. | 251/129.06 X |
| 5,325,880 | 7/1994 | Johnson et al. | 137/1 |
| 5,619,177 | 4/1997 | Johnson et al. | 251/129.01 X |
| 5,628,411 | 5/1997 | Mills et al. | 251/129.06 X |
| 5,671,905 | 9/1997 | Hopkins, Jr. | 251/129.01 |

*Primary Examiner*—Stephen M. Hepperle
*Assistant Examiner*—John Bastianelli
*Attorney, Agent, or Firm*—Vincent A. Cichosz

[57] ABSTRACT

A shape memory alloy actuator assembly for a fuel injector, wherein the response times of the shape memory alloy element is decreased to less than about 1 millisecond by forced, convective heat transfer from the SMA element or elements. The forced, convective heat transfer is provided by the circulation of fluid across the SMA element by a metering orifice plate, which directs a fluid flow across the SMA element so as to maximize the area of contact between the fuel and the SMA element, regardless of whether the fuel injection valve is opened or closed. Use of forced convective heat transfer in accordance with the present invention allows greater power input levels than previously possible without resulting in an over-temperature condition of the SMA alloy, as well as constant response times.

21 Claims, 4 Drawing Sheets

METHOD AND APPARATUS FOR CONTROL OF A SHAPE MEMORY ALLOY ACTUATOR FOR A FUEL INJECTOR

TECHNICAL FIELD

The present invention relates to a shape memory alloy actuator for a fuel injector, wherein the response time of the actuator is improved by providing forced, convective heat transfer to the shape memory alloy actuator.

BACKGROUND OF THE INVENTION

Certain metals commonly referred to as shape memory alloys exhibit characteristic material properties that make them desirable for use in actuators. Shape memory alloy actuation provides greater force per volume than electromagnetic-type actuation, and is also less complex. These characteristics make shape memory alloy actuation highly desirable for use in fuel injectors, particularly automotive fuel injectors.

Shape memory alloys (hereinafter "SMAs") undergo a temperature-related phase change which is characterized by the memory of any mechanical configuration imposed on the material in its austenitic crystalline phase. In particular, SMAs have two different crystal structures that are determined by temperature. In its low temperature state the material exhibits a martensitic crystal structure which has a relatively low modulus of elasticity, and which can be easily deformed. However, when the alloy is heated above a temperature threshold, the transition temperature, its crystal structure changes to austenite and the alloy returns to its original configuration.

This temperature-dependent memory characteristic is exploited in actuators for fuel injectors by providing a bias mechanism, for example a spring, to deform the SMA element while it is in the low temperature state, then raising the SMA element's temperature, for example by resistance heating, in order to induce a return to the element's original configuration. The return to the SMA element's original conformation thereby creates motion in the spring, which in conjunction with the remainder of the actuator assembly results in opening or closing of the fuel injector valve. Cooling of the SMA element returns the element to its low temperature, easily deformed phase. The bias spring force results in mechanical motion in the actuator which closes or opens the fuel injector valve. A major challenge in the use of SMAs in automotive fuel injectors has been to reduce the response time of the alloy so that the opening or closing cycle of the actuator is reduced to one millisecond or less. This fast response time is required in order to provide the necessary minimum flow control necessary under light load engine conditions.

It is known in the art that the response time is affected by the rate of heat transfer (i.e., cooling) of the SMA element, and that the geometry of the alloy element has a direct affect on this heat transfer rate. SMA actuator geometries comprising small-diameter wires, ribbons, or thin films, for example, have been shown to maximize the heat transfer rate of the alloy, thereby achieving faster response times. Such geometries have been described in U.S. Pat. No. 4,806,815 to Homma; U.S. Pat. No. 4,973,024 to Homma; U.S. Pat. No. 5,061,914 to Busch, et al.; U.S. Pat. No. 5,211,371 to Coffee; and U.S. Pat. No. 5,325,880 to Johnson et al. The width-to-thickness ratios disclosed in the prior art are in the range from 50:1 to 4:1, and resulted in best minimum response times of about 10 milliseconds. However, none of these geometries yield the requisite degree of heat transfer effective to provide response times at the 1 millisecond level required for fuel injector applications.

It is further known in the art that the response time is affected by the energy input (e.g., resistance heating) into the SMA element. Ordinarily, a high energy input into the SMA element is desirable, in order to decrease the response time. This energy input has an inherent limitation, however, due to the nature of the materials suitable for shape memory alloys. An "over-temperature" condition results in strain recovery loss or destruction of the alloy. The response time of SMA actuators in the prior art have accordingly been limited in the amount of input power which may be applied to the SMA elements, and again, are limited to response times of no less than 10 milliseconds. There thus remains a need in the art for economical methods and apparatus for controlling the operating conditions of shape memory alloy actuators for fuel injectors so as to provide response times of less than 10 milliseconds, and preferably less than about 1 millisecond.

SUMMARY OF THE INVENTION

The above-discussed and other drawbacks and deficiencies of the prior art are overcome or alleviated by the method and apparatus of the present invention, wherein the response time of an SMA actuator assembly for a fuel injector is decreased to less than 10, and even to less than about 1 millisecond by forced, convective heat transfer from the SMA element or elements. The forced, convective heat transfer is provided by the circulation of fluid across the SMA element by a metering orifice plate and housing design, which direct a fluid flow across the SMA element so as to maximize the area of contact between the fuel and the SMA element regardless of whether the fuel injection valve is opened or closed. Use of forced, convective heat transfer in accordance with the present invention allows greater power input levels than previously possible without resulting in an over-temperature condition of the SMA alloy.

In another embodiment of the present invention, the response time of the actuator is adjusted or optimized by controlling at least one of the convective heat transfer coefficient, the fluid flow path across the actuator, the fluid flow rate across the actuator, the thickness of the thermal boundary layer adjacent to the SMA element, the maximum temperature reached by the SMA element, the ambient temperature of the fluid, the circulation rate of the fluid, and the temperature difference between the actuator and the ambient fluid.

In still another embodiment of the present invention, the minimum lift of the valve is adjusted so that any variation above this minimum has no significant effect on the flow rate of fluid through the valve, and the input power into the SMA element is controlled in order to maintain consistent maximum material temperature, thereby maintaining relatively consistent reverse transformation response times. Maintenance of consistent response times results in minimum flow rate shifts and thus enhanced fuel injector operation.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DESCRIPTION OF THE PREFERRED EMBODIMENT

In accordance with the present invention, the response time of an SMA actuator assembly for a fuel injector is decreased by providing forced, convective heat transfer from the SMA element or elements. Optimization of the response time is controlled by controlling at least one of the fuel flow paths across the actuator, the fuel flow rate across the actuator, the thickness of the thermal boundary fuel layer adjacent to the SMA element, the maximum temperature reached by the SMA element, the ambient temperature of the fuel, the circulation rate of the fuel, and the temperature difference between the actuator and the ambient fluid. The use of forced, convective heat transfer also allows greater power inputs to the SMA elements than previously possible.

As used herein, "forced" convective heat transfer refers to convective heat transfer caused by fluid having a flow directed so as to contact the shape memory alloy, then directed away from the shape memory alloy, thereby increasing the convective cooling of the shape memory alloy. This forced, convective heat transfer is in lieu of, or additional to, any convective heat transfer that occurs by the mere presence of fluid surrounding the shape memory alloy, or by fluid that is being metered through the valve of the fuel injector. Use of forced, convective heat transfer uniquely reduces the response times of the SMA element or elements to less than 10 milliseconds, preferably less than about 5 milliseconds, and even more preferably to less than about 1 millisecond, which is the level required for automotive fuel injector applications.

Forced, convective heat transfer using fuel as a transfer medium is provided by the apparatus of the present invention shown in FIGS. 1–7, wherein the flow of metered fluid is in the range from about 1.0 to about 12.0 g/sec. Although the FIGURES and the following discussion show the valve in the closed position at ambient fuel temperature, and in the open position upon application of resistance heat to the SMA elements, it is to be understood that the reverse is equally within the scope of the present invention, that is, depending on the original, undeformed configuration of the SMA elements, the valve may be in open position at ambient fuel temperature, and closed upon the application of heat to the SMA elements.

Figure 1:
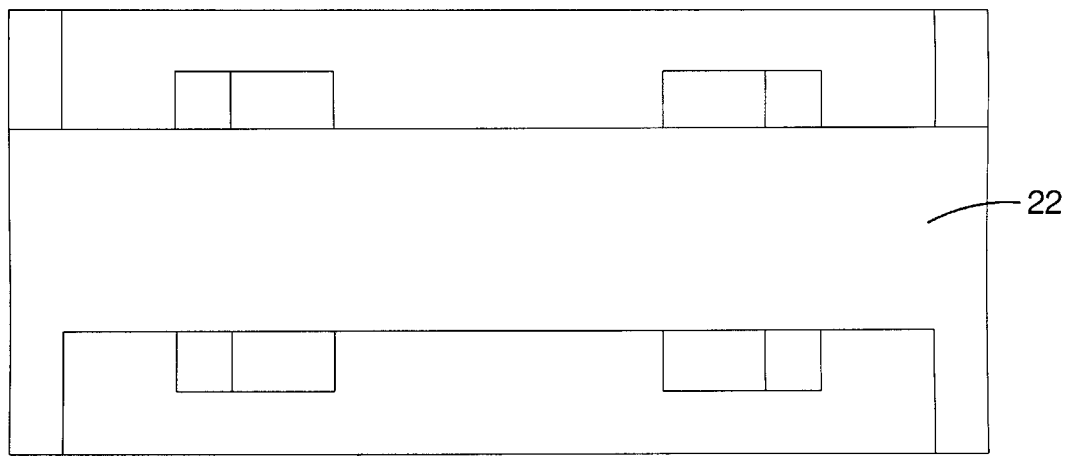
FIG. 1 is an plan view of a an actuator assembly of the present invention showing the length (l) and width (w) dimensions of the SMA element.
Figure 2:
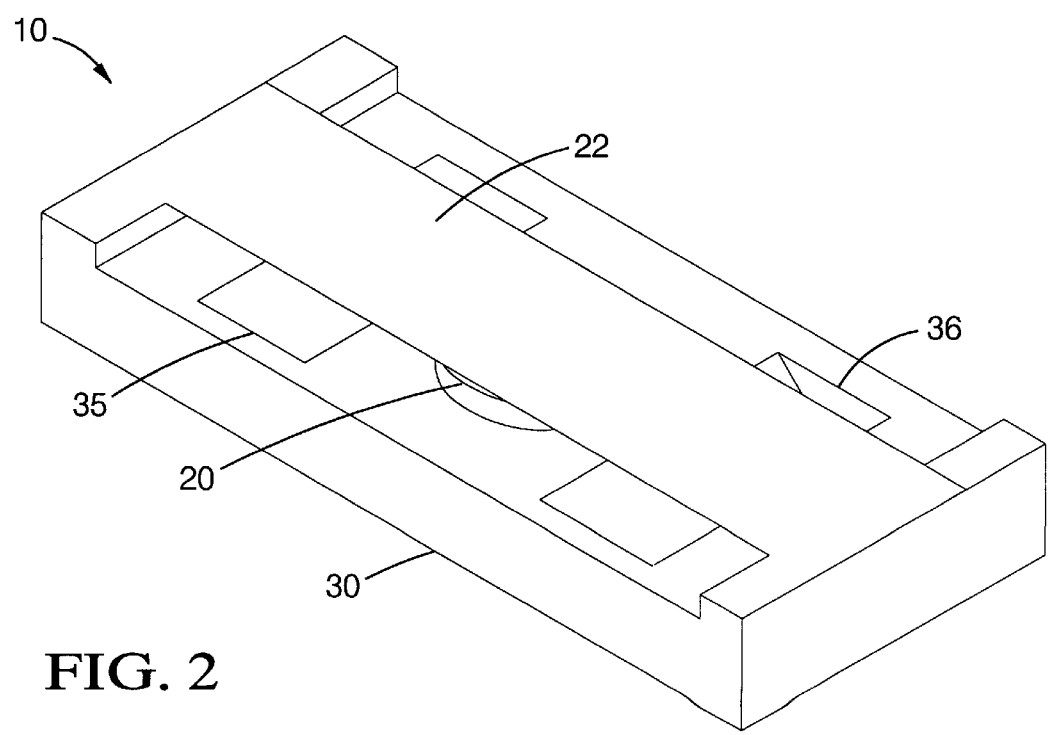
FIG. 2 is an isometric view of an actuator assembly of the present invention comprising a metering orifice plate as shown in FIG. 3, a valve and SMA elements.
Figure 3:
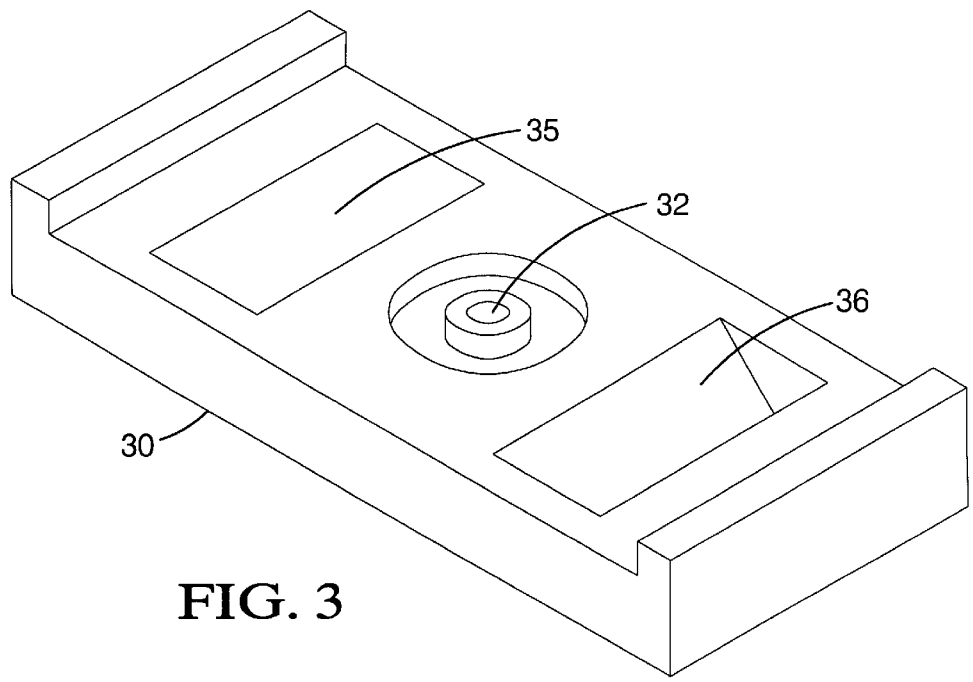
FIG. 3 is an isometric view of a metering orifice plate of the present invention, showing unmetered flow paths.

Accordingly, an actuator assembly 10 for an automotive fuel injector comprises a valve 20, and SMA element 22 in contact with valve 20. All SMA materials presently known are suitable for the practice of the present invention. As shown in FIG. 1, SMA element 22 generally has a width w, a length l, and a thickness which in this view is into the paper. SMA element 22 preferably has a minimum width-to-thickness ratio greater than about 4:1, and preferably greater than about 500:1. Metering orifice plate 30 comprises a flow metering orifice 32 and outlet flow paths 35, 36 disposed on either side of metering orifice.

Figure 4:
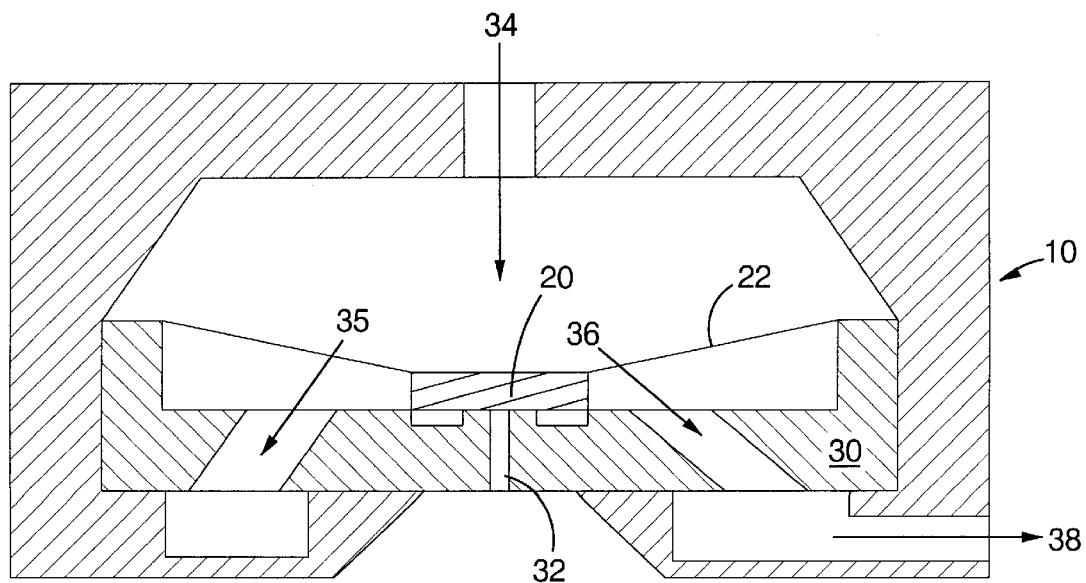
FIG. 4 is a cross-sectional view of the actuator assembly of the present invention with the valve and the metering orifice plate in the closed position, and showing a perpendicular recirculation flow path.
Figure 5:
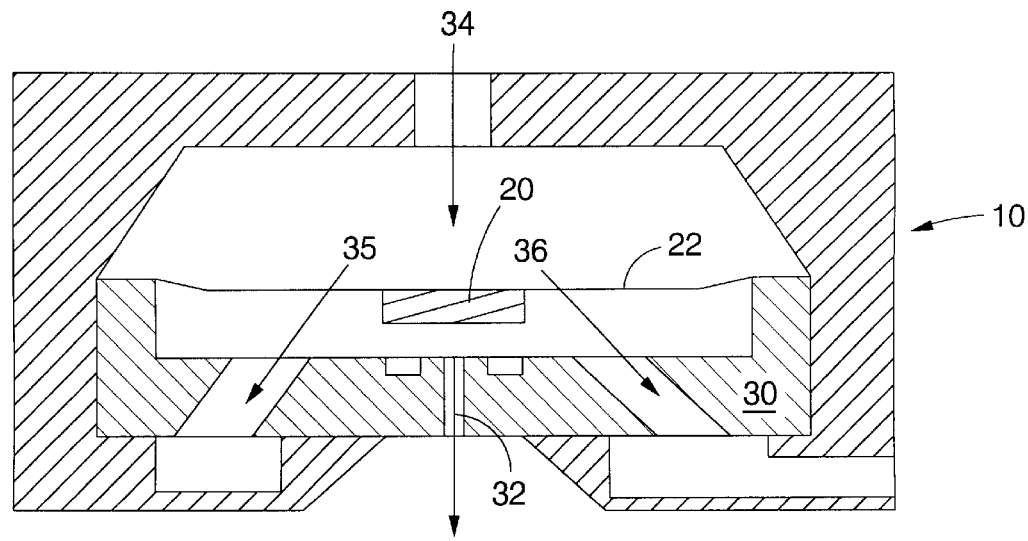
FIG. 5 is a cross-sectional view of the actuator assembly of the present invention with the metering orifice plate in the opened position and showing a perpendicular recirculation flow path.

In FIG. 4 valve 20 is in the closed position at ambient fuel temperature. Application of an electrical current to SMA element 22 results in resistance heating, which raises the temperature of SMA element 22 to above the transition temperature. Conversion of the crystal structure to the austenite phase results in the return of element 22 to its undeformed position, which results in valve 20 being moved to the open position, and flow of metered fuel through flow metering orifice 32 as depicted in FIG. 5. As shown in FIGS. 4 and 5, the forced, convective current of fuel through inlet flow path 34 across SMA element 22 and through outlet flow paths 35, 36 increases the heat transfer rate of SMA element 22. The forced, convective current of fuel exits the actuator assembly 10 through return path 38 which is in fluid communication with outlet flow paths 35, 36. Preferably, flow paths 34, 35, 36 direct the fuel flow path so as to maximize the area of contact between the fuel and SMA element 22. In an important feature of the invention, circulation of fuel across SMA element 22 is effected via flow paths 34, 35, 36 independently of whether valve 20 is in an open or closed position across flow metering orifice 32. Injector closing response time may be reduced to 0.6 milliseconds with use of forced, convective heat transfer as described above. This short response time is particularly advantageous for fuel injector applications.

While the above-described configuration for fuel flow paths 34, 35, 36 is preferred, as it is effective to provide maximum heat transfer using minimum fluid volume circulating across the SMA element, it is to be understood that other arrangements of inlet and outlet orifices and fuel flow paths are effective and are within the scope of the present invention. Thus, where FIGS. 4 and 5 provide for an inlet flow path oriented perpendicularly to the shape memory alloy element, it is also within the scope of the invention to provide an inlet flow path oriented parallel to the shape memory alloy element as is shown in FIG.5.

As with other SMA-based actuators, the opening response time for the injector shown in FIGS. 1–5 is a function of the input power to the SMA element, and the heat transfer rate away from the element. The closing response time is a function of both the amount of energy to be removed and the heat transfer rate from the actuator. Use of forced convective heat transfer in accordance with the present invention provides several mechanisms whereby the opening and closing response times may be adjusted and optimized, that is, by control of at least one of the convective heat transfer coefficient, the fuel flow path(s) across the actuator, the fuel flow rate across the actuator, the thickness of the thermal boundary layer adjacent to the SMA element, the maximum temperature reached by the SMA element, the ambient temperature of the fuel, the circulation rate of the fuel, and the temperature difference between the actuator and the ambient fluid. Final optimization of the response time for an SMA actuator may be both modeled and empirically determined, and will ultimately depend on competing considerations, some of which are outlined below.

For example, different actuator geometries will require different flow paths and flow rates to obtain the optimum heat transfer rate. Ideally, the convective fluid is directed across the SMA elements in the direction which gives the greatest fluid contact surface area.

In addition, the fluid velocity must be sufficient to move the fluid across the alloy in a time faster than the targeted response time. This allows the removal of energy away from the alloy and prevents vapor generation around the alloy, which would lower the overall heat transfer rate. The rate of heat transfer is a particularly important consideration, in that if it is too great, the actuator will require large input power levels to reach the crystal structure phase change temperature. If the heat transfer rate is too low, the input power must be decreased to avoid a material over-temperature condition, and the opening and closing response times are increased.

Use of forced convective heat transfer from the SMA element not only allows a decrease in the response time via an increase in the convective heat transfer from the SMA element, but also allows optimization of the input power to the SMA actuator. As discussed above, the opening response time for a fuel injector comprising an SMA actuator is dependent not only on the heat transfer rate from the actuator, but also on the input power to the SMA elements, for example in the form of resistance heating. The amount of heating has heretofore been limited to an amount which will not result in an over-temperature condition. The method in accordance with the present invention allows greater heat transfer away from the SMA element, and therefore greater power input without the risk of SMA over-temperature.

Figure 8:
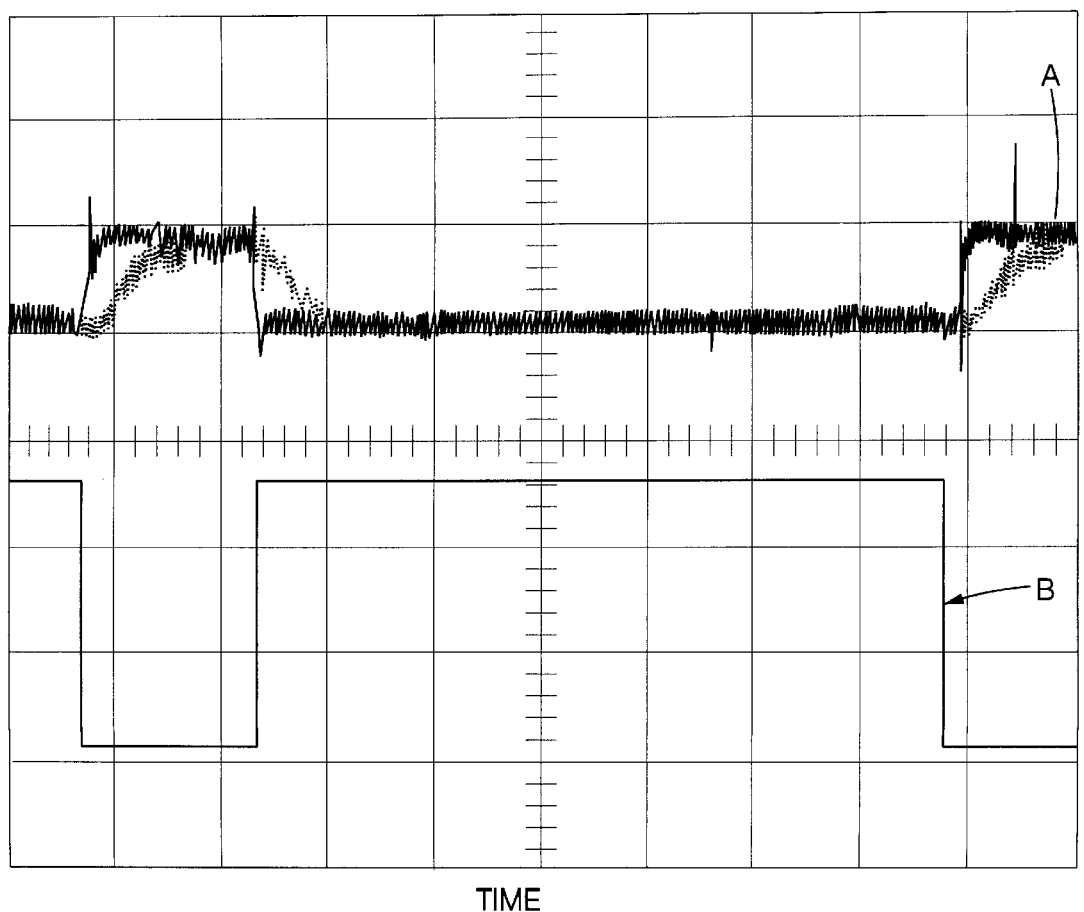
FIG. 8 is an oscilloscope trace of (A) the actuator position vs. time and (B) the supply power logic trace, wherein the position traces are with and without the circulation flow induced forced convection of the present invention.

FIG. 8 is an oscilloscope trace of (A) the actuator position vs. time and (B) the supply power logic trace. The position traces are with and without forced convective heat transfer, and thus have different heat transfer rates. The traces indicate that a change in the slope of the opening and closing events occurs as a result of the circulation flow rate addition. The time required to deactuate the actuator is reduced due to the increase in heat transfer rate from the fuel flow path. Furthermore, the time required to actuate the actuator is reduced due to the fact that the input power is increased as a result of the increased heat transfer rate, while the risk of alloy over temperature is reduced.

However, the level of input power also requires consideration of the factors which control the response time for the closing (cooling) cycle. The heat transfer rate for the closing cycle is determined by the convective heat transfer coefficient and the temperature difference between the SMA element and the ambient fluid. Control of the SMA peak temperature to that just above the full austenite finish transformation temperature results in the minimum energy to be removed for cooling, and thus shorter closing response times. Optimal closing time is thus obtained by adjusting the SMA element temperature to just above that required to cause the return to the original, undeformed configuration. This implies that optimal closing time is achieved by restricting the input power to a minimum. But because the forced convective heat transfer of the present invention increases the convective heat transfer coefficient, the heat transfer rate allows both an increase in input power and a reduction in the opening response time, as well as decreased closing response times.

In a preferred embodiment of the present invention, the peak temperature of the SMA element is further controlled in order to maintain constant response times, regardless of ambient fuel temperature variations. In this embodiment, the minimum valve travel (minimum distance between the valve and the valve metering orifice when the valve is in the open position) is such that any variation above this minimum has no significant effect on the flow rate of the fluid through the metering orifice, i.e., the pressure drop is only across the metering orifice. This embodiment is particularly advantageous in that maintaining constant response times with sufficient valve travel results in minimum flow rate shifts regardless of any changes in ambient fluid temperature or convective cooling rates.

Figure 6:
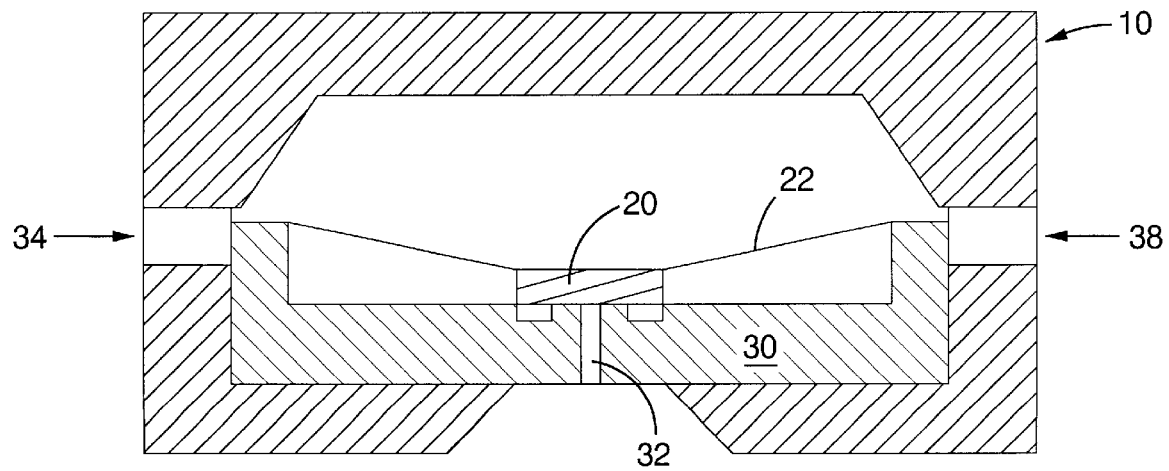
FIG. 6 is a cross-sectional view of an alternative embodiment of the actuator assembly of the present invention with the valve in the closed position and showing a parallel recirculation flow path.
Figure 7:
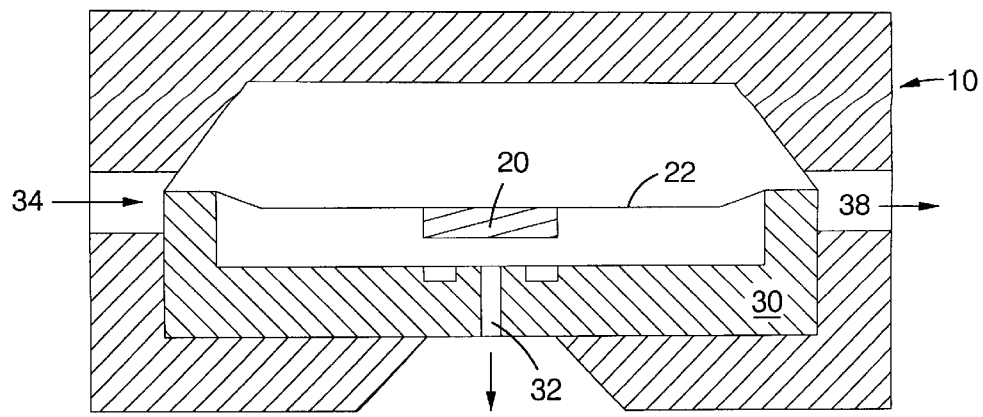
FIG. 7 is a cross-sectional view of an alternative embodiment of the actuator assembly of the present invention with the valve in the open position and showing a parallel recirculation flow path.

As shown in FIGS. 6 and 7 inlet flow enters via flow path 34 above SMA film element 22, directing fuel to maximize contact area across elements 22. The forced, convective current of fuel exits the actuator assembly 10 through return path 38. The flow velocity is such that a sufficient volume of fluid is directed to and away from the SMA elements to affect heat transfer in a time period preferably less than the desired response time. Thus for an SMA element of 3 mm length, having a width of 0.50 mm and a thickness of 0.010 mm, a flow path directing fluid across the length of the SMA element (FIGS. 6 and 7) at a velocity of 3 meter/second results in the fluid traversing the length of the SMA element in 1 millisecond. A flow path directing fluid across the thickness of the SMA element results in the fluid traversing the thickness of the SMA element in 3 microseconds. In these embodiments the flow paths direct the fluid along and across the SMA elements length and thickness. Proper selection of the base circulation flow rate through the actuator results in response times of less than about one millisecond. Proper selection of flow rate and flow path results in a thermal boundary layer of approximately 1.5 times the thickness of the SMA element.

In another embodiment of the present invention, the fluid flow path through assembly 10 and across SMA element 22 is such that the metered flow provides convective heat transfer effective to result in an optimal response times of less than about 1 millisecond. This embodiment is the optimum configuration with respect to input power, since when the valve is in the closed position, there is no enhanced convective cooling, and thus the heat transfer away from SMA element 22 and the input power is at a minimum. When the valve is in the open position, the metered flow follows a path which results in enhanced convective heat transfer, and is of sufficient velocity such that response times equal or less than approximately 1 millisecond are realized.

While preferred embodiments have been shown and described, various modifications and substitutions may be made thereto without departing from the spirit and scope of the invention. Accordingly, it is to be understood that the present invention has been described by way of illustration and not limitation.

We claim:

1. A shape memory alloy fuel injector having forced convective heat transfers, comprising:

an actuator assembly including a valve and at least one shape memory alloy element in contact with the valve, the shape memory alloy element further having a characteristic phase change transition temperature wherein the shape memory alloy element and the valve have a first position at a temperature below the transition temperature and a second position at a temperature above the transition temperature; and a metering orifice plate including a flow metering orifice which is blocked by the valve at either the first position or second position of the shape memory alloy element and the valve, thereby providing a metered flow of fluid through the fuel injector;

at least one inlet flow path and at least one outlet flow path, wherein the at least one inlet flow path and the at least one outlet flow path direct a flow of fluid independent from the metered flow of fluid across the shape memory alloy element, thereby providing a thermal boundary layer between the shape memory alloy element and the bulk flow of fluid that results in an enhanced convective heat transfer rate from the shape memory alloy element.

2. The shape memory alloy fuel injector of claim 1, wherein:
the shape memory alloy element has a width-to-thickness ratio greater than about 4:1.

3. The shape memory alloy fuel injector of claim 2, wherein:
the shape memory alloy element has a width-to-thickness ratio greater than about 500:1.

4. The shape memory alloy fuel injector of claim 3, wherein:
the configuration of the actuator assembly results in movement of the valve from one position to the other position in less than about 1 millisecond.

5. The shape memory alloy fuel injector of claim 1, wherein:
the shape memory alloy element is oriented perpendicular or parallel to the inlet flow path.

6. The shape memory alloy fuel injector of claim 1, wherein:
the flow path is effective to provide maximum heat transfer using minimum fluid volume circulating across the shape memory alloy element.

7. The shape memory alloy fuel injector of claim 1, wherein:
the thermal boundary layer is about 1.5 times the thickness of the shape memory alloy element.

8. The shape memory alloy fuel injector of claim 1, wherein:
the minimum valve travel is such that a greater distance between the valve and the valve orifice has no significant effect on fluid flow rate through the metering orifice.

9. A method for optimizing the response time of a shape memory alloy fuel injector, comprising providing a fuel injector including an actuator assembly including a valve and at least one shape memory alloy element in contact with the valve;
the shape memory alloy element further having a characteristic phase change transition temperature, wherein the shape memory alloy element and the valve have a first position at a temperature below the transition temperature and a second position at a temperature above the transition temperature, the movement of the valve between the first and second positions providing a metered flow of fluid through the fuel injector;
and further wherein the time required for the shape memory alloy element and valve to move from one position to the other position is the response time; and
forcing fluid flow around the shape memory alloy element independently of metered fluid flow, thereby increasing the convective heat transfer coefficient of the fuel injector.

10. The method of claim 9, wherein: the independent fluid flow around the shape memory alloy element is directed in a flow path by a metering orifice plate including a flow metering orifice which is blocked by the valve at either the first position or the second position of the shape memory alloy element and the valve, at least one inlet flow path and at least one outlet flow path.

11. The method of claim 9, wherein: the shape memory alloy element has a width-to-thickness ratio greater than about 4:1.

12. The method of claim 11, wherein: the shape memory alloy element has a width-to-thickness ratio equal to or greater than about 500:1.

13. The method of claim 9, wherein: the flow path is effective to provide maximum heat transfer using minimum fluid volume circulating across the shape memory alloy element.

14. The method of claim 9, wherein: the forced fluid flow creates a thermal boundary layer between the shape memory alloy element and the bulk of the fluid flow.

15. The method of claim 14, wherein: the thermal boundary layer is about 1.5 times the thickness of the shape memory alloy element.

16. The method of claim 9, wherein: the minimum valve travel is such that a greater distance between the valve and the valve orifice has no significant effect on fluid flow rate through the metering orifice.

17. The method of claim 9, wherein: the response time of the shape memory alloy element is adjusted by controlling at least one of the convective heat transfer coefficient, the fluid flow path across the actuator assembly, the fluid flow velocity across the actuator, the thickness of the thermal boundary layer adjacent to the shape memory alloy element, the maximum temperature reached by the shape memory alloy element, the ambient temperature of the fluid, the circulation rate of the fluid, the demetered flow rate, and the temperature difference between the actuator and the ambient fluid.

18. The method of claim 9, wherein: the response time of the shape memory alloy element is adjusted by controlling the fluid flow path across the actuator assembly, the fluid flow velocity across the actuator assembly, the thickness of the thermal boundary layer adjacent to the shape memory alloy element, and the maximum temperature reached by the shape memory alloy element.

19. The method of claim 9, wherein: the response time of the shape memory alloy element is less than about 1 millisecond.

20. The method of claim 9, wherein: input power into the shape memory element causes the shape memory alloy element to attain the temperature above the transition temperature, and further wherein the input power level is controlled to optimize response time and prevent an over-temperature condition.

21. The method of claim 14, wherein: input power into the shape memory element causes the shape memory alloy element to attain the temperature above the transition temperature, and further wherein the input power level is controlled so as to maintain constant response times.

* * * * *